Feb. 5, 1952 F. H. OWENS 2,584,733

MAGAZINE HAVING SPOOL ROTATION INHIBITING MEANS

Filed April 8, 1948 2 SHEETS—SHEET 1

INVENTOR
FREEMAN H. OWENS
BY James and Franklin
ATTORNEY

Feb. 5, 1952 F. H. OWENS 2,584,733

MAGAZINE HAVING SPOOL ROTATION INHIBITING MEANS

Filed April 8, 1948 2 SHEETS—SHEET 2

INVENTOR
FREEMAN H. OWENS
BY James and Franklin
ATTORNEY

Patented Feb. 5, 1952 2,584,733

UNITED STATES PATENT OFFICE 2,584,733

MAGAZINE HAVING SPOOL ROTATION INHIBITING MEANS

Freeman H. Owens, New York, N. Y.

Application April 8, 1948, Serial No. 19,683

9 Claims. (Cl. 242—55)

This invention relates to a magazine having rotatable spools therein and more particularly to means for preventing the rotation of said spools when said magazine is not in proper position on the apparatus in conjunction with which it is to used.

This invention has broad applicability to any apparatus in which a replaceable element is adapted to be rotated and in which rotation of the element is not desired when it is not in place on the apparatus.

Of the many applications to which this invention pertains there may be mentioned as most important motion picture cameras, motion picture projectors, photographically recorded sound track reproducers, and magnetic wire or tape reproducers. The invention is herein described and illustrated with respect to the last of these applications, and one species of it is shown in conjunction with a magnetic tape recording and reproducing apparatus the various elements of which are described with particularity in my copending application for Letters Patent, Serial No. 655,965, filed March 21, 1946, now Patent No. 2,513,423, dated July 4, 1950. It is to be understood, however, that this application has been selected by way of illustration only and the various parts thereof form no part of the present invention except as specifically claimed herein. On the contrary, as has above been set forth, this invention is applicable to many types of apparatus.

This application is a continuation-in-part of my application, Serial No. 676,703, filed June 14, 1946, and entitled "Securing and Driving Means for Rotatable Magazine-Contained Spool."

For convenience of operation, and particularly to eliminate the vexing operation of threading and unthreading, it is desirable in apparatus of the type described to have the reproducing medium, whether it be in the form of film, magnetic tape or magnetic wire, wound upon a pair of spools which are contained within a magazine-like structure which is adapted to be removed from or replaced upon the reproducing apparatus as a unit. While the magazine is not in place upon the apparatus, it is essential that the spools upon which, for example, the magnetic tape is wound, be non-rotatable, in order that the tape not be prematurely unwound or dethreaded therefrom. When the magazine is placed in operative position upon the reproducing apparatus, however, it is likewise essential that the spools be rotatable so that the tape may be wound upon one and simultaneously unwound from the other. In the winding and unwinding operation, it is also necessary that the spool upon which the tape is to be wound be suitably driven in rotation.

It is, therefore, a prime object of the present invention to devise a magazine structure containing one or more spools rotatably mounted therein, in which rotation of the spools is prevented until such time as the magazine is in proper position on the apparatus in conjunction with which it is to be used.

It is yet another object of the present invention to devise such a magazine in which means are provided, apart from the means directly active upon the spools to prevent rotation thereof, to prevent motion of the reproducing medium wound upon the spools until such time as the magazine is in proper position on the apparatus.

Another specific object of the present invention is to devise a magazine which is slidable onto the apparatus with which it is to be used, rotation of the spools being positively prevented until the magazine is in proper position on the apparatus.

Yet another object of the present invention is to devise a magazine which, when not in position on the apparatus with which it is to be used, is so constructed as to positively prevent rotation of the spools contained therein, the mechanism preventing such rotation being rendered inoperable by engagement with an element positioned on the apparatus. In a more specific form, said element is engageable with the spool rotation restricting means by passing through an aperture in said magazine.

It is yet another object of the present invention to combine mechanism embodying the above objects into a simple, compact structure particularly adapted for use in small, home style apparatus of whatever nature desired.

To the accomplishment of the foregoing objects and such other objects as may hereinafter appear, my present invention relates to the construction of a magazine spool rotation inhibiting means and driving means as sought to be defined in the appended claims and as described in the accompanying specification, taken together with the drawings, in which:

Viewed in its broad aspects, my invention comprises a magazine, generally designated A, in which is housed one or more spools B upon which is wound a reproducing medium C, here shown in the form of a magnetizable tape which is adapted to be wound and unwound from and between the spools B. The magazine A, which is removable from and replaceable on an apparatus, generally designated E, which acts in conjunction with the tape C to record sound thereon or reproduce the sound thus recorded, contains a rotation inhibiting means, generally designated D, which, when the magazine A is not in proper position on the apparatus E, serves to inhibit or positively prevent undesired rotation of either of the spools B. The apparatus E carries a releasing means, generally designated F, which is active upon the rotation inhibiting means D to render the same ineffective and thus render the spools B free to rotate with respect thereto whenever the magazine A is placed in its proper position on the apparatus E. In order to render each of the spools B drivable in rotation in one direction and free to rotate in the other direction, a driving means G is provided engageable with the spools B when the magazine A assumes its proper position upon the apparatus E.

Figure 1:
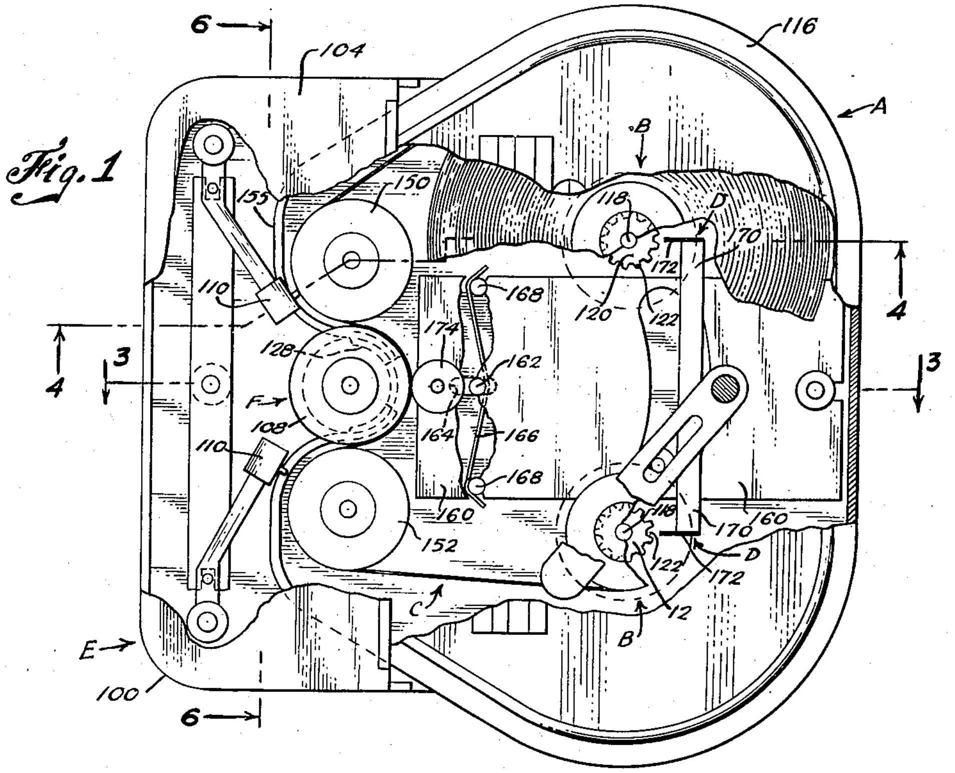
Fig. 1 is a top view of an embodiment of recording apparatus, the top wall of the magazine being broken away in part to disclose the interior thereof.

The magazine A and reproducing apparatus E of the embodiment illustrated are so constructed and related that the magazine A is adapted to be brought to proper position upon the apparatus E by sliding the same over the top of the apparatus, that is to say, in the plane of Fig. 1. To this end, the driving means G is movable on the apparatus E between a semi-housed position in which it does not interfere with the sliding motion of the magazine A and a projecting position in which it is engageable with the spools B in the magazine A. The rotation inhibiting means D in the magazine A is so constructed as to be movable to inoperative position, releasing the spools B for rotation, only after the magazine A has been slid over the top of the apparatus E to its proper position. In addition, in this embodiment, means are provided for clamping the reproducing medium C itself when the magazine A is removed from the apparatus E so as to prevent unwanted motion of the medium C, this action being supplementary to that of the rotation inhibiting means D upon the spools B.

The apparatus E comprises a framework 100, including a top plate 102 over which the magazine is adapted to be slid, and a cover 104 extending over at least a portion of the top plate 102 and defining a housing or recess 106 into which the front portion of the magazine A is adapted to be received and in which is housed a tape driving roller 108 and the magnetizing means 110 adapted to cooperate with the reproducing medium C so as to record thereon or reproduce therefrom. The apparatus E is provided with a stop lug 115 adapted to be received within a slot 117 in the magazine A for fixing their relative positions.

The magazine A comprises a casing 116 within which are housed the spools B, each being mounted upon a shaft 118 for rotation therewith. A disc 120 provided with a plurality of peripheral notches 122 is fixed to the shaft 118 below each of the spools B and the shaft 118 is journalled in the central casing member 124 which extends through the magazine A approximately intermediate its height. The magazine is also provided with a bottom wall 126 which is adapted to slide over the top plate 102 of the apparatus E. The mechanism contained between the central casing member 124 and the bottom wall 126 forms no part of the present invention, but is described with particularity in my invention, but may take any desired form.

Figure 2:
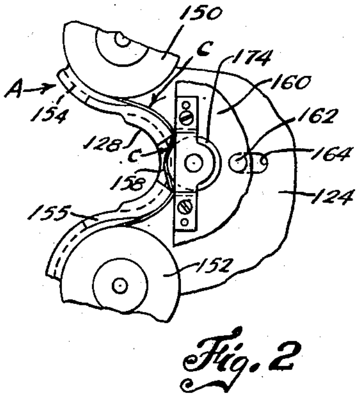
Fig. 2 is a top view of the front central portion of the magazine, the top thereof being removed.
Figure 3:
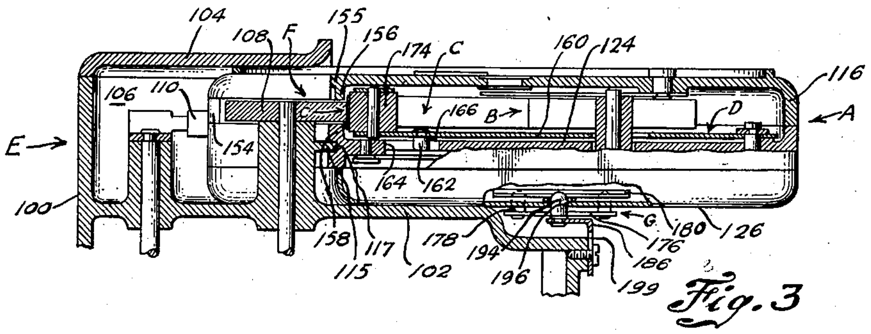
Fig. 3 is a side cross-sectional view taken along the line 3—3 of Fig. 1.
Figure 6:
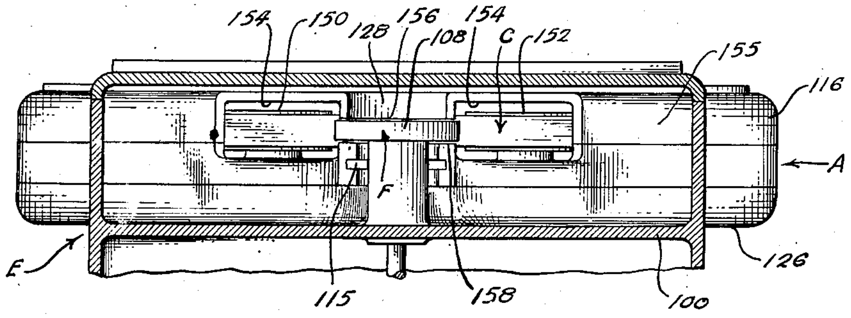
Fig. 6 is a front view of the central portion of the magazine, taken along the line 6—6 of Fig. 1.

The front portion of the magazine A narrows so as to be receivable within the housing 106 and the central portion thereof is cut back so as to define the indentation 128. A pair of rollers 150 and 152 are positioned to either side of the indentation 128 and the reproducing medium C is adapted to pass from one spool B over the roller 152, around the indentation 128, over the roller 150, and thence to the other spool. A slot or aperture 154 is formed in the front end wall 155 of the magazine A, said slot exposing the reproducing medium C as it passes over the rollers 150 and 152 so as to permit access thereto by the magnetizing means 110. In addition, the aperture at the center of the indentation 128 is defined between flanges 156 and 158 (see Figs. 2, 3 and 6), the distance between the opposing faces of said flanges 156 and 158 being sufficient to permit entry therethrough of the drive wheel 108 but insufficient to permit egress therefrom of the reproducing medium C, the height of the reproducing medium C being greater than the opening between the flanges 156 and 158.

A plate 160 (see Fig. 3) is mounted on the central casing member 124 so as to be slidable parallel thereto, a pin 162 projecting downwardly from the plate 160 into slot 164 formed in said central casing member 124 so as to limit said sliding motion. A spring 166 is active upon the pin 162 so as to urge the same, and hence the plate 160, toward the front end wall 155 of the magazine, the ends of the spring 166 being retained by pins 168 secured to the central casing member 124.

The plate 160 is positioned between the spools B and preferably slightly below them and is provided with widely projecting arms 170 each having a finger 172 in line with the discs 120 and receivable within the peripheral notches 122 of said discs. When the spring 166 slides the plate 160 toward the aperture 154 in the front end wall 155 of the magazine A, the fingers 172 will engage in the peripheral slots 122 of the discs 120 and thus positively prevent rotation of the spools B. When the plate 160 is moved in the opposite direction, away from the apertured front end wall 155, the fingers 172 will be removed from the peripheral notches 122 and consequently the spools B will be free to rotate as desired.

A tension roller 174 (see Figs. 1, 2 and 3) is rotatably mounted on the end of the plate 160 opposite the indentation 128 so as to project slightly therefrom toward the front end wall 155 of the magazine A and the reproducing medium C is adapted to pass thereover. It will be noted from Fig. 3 that the height of the tension roller 174 is comparable to that of the reproducing medium C so that the roller 174, like the reproducing medium C, cannot project out from the magazine A past the flanges 156 and 158. When the plate 160 is moved by the spring 166 toward the front end wall 155 of the magazine A, as will be the case when the magazine is not in position on the apparatus E, the roller 174 will press or clamp the reproducing medium C between itself and the flanges 156 and 158 at the same time that the fingers 172 engage in the peripheral notches 122 in the discs 120 attached to the spools B. Consequently, when the magazine is removed from the apparatus, not only will the spools B be locked against rotation, but the reproducing medium C itself will be clamped in position. However, when the magazine A is slid to its proper position on the apparatus E, the driving wheel 108 will enter between the flanges 156 and 158 (see Fig. 3) and will force the tension roller 174 and consequently the plate 160 in a direction away from the front end wall 155, thus simultaneously releasing the reproducing medium C from its clamped position between the tension roller 174 and the flanges 156 and 158 and releasing the fingers 172 from their engagement with the discs 120. The reproducing medium C will then be clamped in proper driving relationship between the driving wheel 108 and the tension roller 174 and the spools B will be rotatable so that reproduction may take place.

Figure 5:
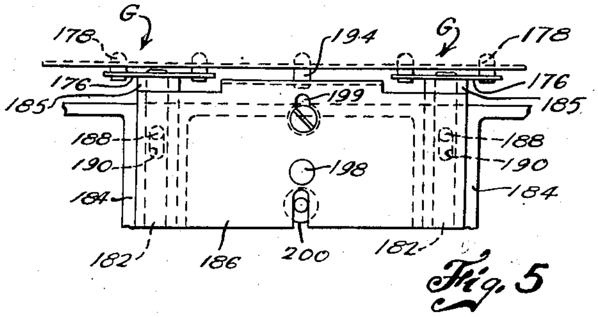
Fig. 5 is a view showing the movable centering and driving means.
Figure 4:
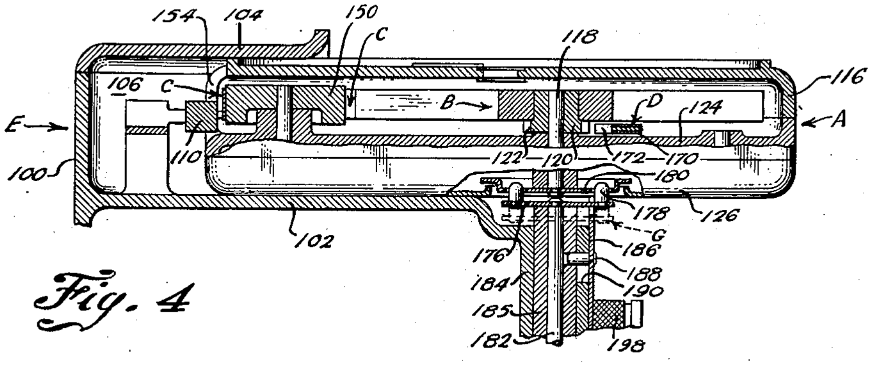
Fig. 4 is a side cross-sectional view taken along the line 4—4 of Fig. 1.

The driving means G (see Figs. 4 and 5) may take the form of discs 176 having pins 178 projecting upwardly therefrom and receivable in apertures in a second disc 180 fast on the spool shafts 118 in the magazine A. The discs 176 are rotatable with suitably driven shafts 182, both the disc and shaft being vertically slidable inside fixed bushings 184 which form part of the apparatus E. Sleeves 185 within which the shafts 182 are rotatable may be interposed between the shafts 182 and the bushings 184 so as to be vertically movable with the shafts 182. A plate 186 is provided with a pair of pins 188 each slidable in a slot 190 in a bushing 184 and engageable with a sleeve 185 within which a shaft 182 is rotatable so as to bodily move the shafts 182, the sleeves 185 and the discs 176 vertically between a semi-housed position shown in broken lines in Fig. 4, in which the tips of the projections 178 are positioned below the top wall 102 of the apparatus E so that the magazine A may be slid into proper position thereon, and a projecting position as shown in the solid lines in Fig. 4, in which the projections 178 are moved upwardly so as to be receivable within the apertures in disc 180 so as to drive the spools B in rotation.

Centrally mounted upon the same plate 186 is a centering and locking pin 194 which is adapted, when the plate 186 is moved to its upward position, to be received within a suitable aperture 196 in the bottom wall 126 of the magazine A (see Fig. 3) so as to lock the latter in its proper position. A fingerpiece 198 may be provided for manipulation of the plate 186 and pin and slot arrangements designated generally 199 and 200 may be provided for limiting and controlling the up and down motion of the plate 186 and for retaining it in position on the apparatus E.

In the embodiment illustrated, when the magazine A is removed from the apparatus E the spring 166 active upon the pin 162 will move the plate 160 toward the apertured front end wall 155 of the magazine A, thus causing engagement between the fingers 172 and the peripheral notches 122 in the discs 120 so as to positively prevent rotation of the spools B. At the same time, the reproducing medium C is pushed forward by the tension roller 174 until it comes in contact with the flanges 156 and 158 at the upper and lower portions respectively of the aperture 154 in the magazine front wall 155, the reproducing medium C being clamped thereby so as to prevent any undesired movement thereof. Before the magazine A is slid into position on the apparatus E, the plate 186 is moved downwardly by means of the fingerpiece 198 so that the driving means G and the locking pin 194 will both move downward to a non-interfering semi-housed position. The magazine A is then slid home, the driving wheel 108 entering the magazine A between the flanges 156 and 158 and moving the tension roller 174 away from the front wall 155, the reproducing medium C being clamped between the wheel 108 and the roller 174. When the magazine A has been slid all the way home, the tension roller 174 will have been moved backwardly an amount sufficient so that the fingers 172 will become disengaged from the peripheral slots 122 in the discs 120, thus releasing the spools B for rotation. The plate 186 is then moved upwardly so that the locking pin 194 enters the aperture 196 in the magazine A, thus fixing it in proper position, and the driving means G makes operative connection with each of the spools B so that the latter may be driven in rotation. It is to be noted that the plate 186 cannot be moved upwardly until the magazine A is in its proper position, with the aperture 196 in registration with the locking pin 194, and that the spools B are not released for rotation until the same event occurs so that foolproof operation of the apparatus is ensured, it being impossible to drive the spools in rotation until the magazine A is in proper position, and the spools B being positively prevented from rotation until that time.

In the illustrated embodiment of my invention, the spools B in the magazine A are positively prevented from rotation when the magazine A is not in proper position on the apparatus E, the rotation inhibiting means D being automatically released so that the spools B can be rotated as soon as the magazine A is in proper position on the apparatus E without requiring any special action to that end on the part of the user of the apparatus. The driving wheel 108 is itself enterable into the magazine A through an aperture 154 therein so as not only to engage the reproducing medium C and to drive the same but also to release the rotation inhibiting means D and thus render the spools B rotatable and the reproducing medium C movable. In the illustrated embodiment, manual manipulation of the driving means G is necessary, after the magazine A is in its proper position, in order to operatively connect them to the spools B.

The interaction of the various elements of the illustrated embodiment presents many novel features as defined in the appended claims and it will be apparent that many detailed variations may be made in the design and arrangement of the illustrated elements without departing from the spirit of my invention.

I claim:

1. A magazine comprising a casing having a bottom wall and an apertured end wall, a pair of spools rotatably mounted in said casing parallel to said bottom wall upon which is wound and between which extends a reproducing medium adapted to be wound upon one spool as it is unwound from the other, a disc having a peripheral opening connected to and parallel with said spools for rotation therewith, a plate slidable parallel to the bottom wall of said casing, said plate carrying a pair of fingers each engageable in the peripheral opening of one of said discs when said plate is moved towards said apertured end wall and disengageable therefrom when said plate is moved away from said apertured end wall, a spring active on said plate to move it toward said apertured end wall, a portion of said plate being engageable by an element enterable into said magazine from the exterior thereof, said plate being movable thereby away from said apertured end wall so as to release said spools for rotation.

2. A magazine comprising a casing having an apertured end wall, a pair of spools rotatably mounted in said casing upon which is wound and between which extends a reproducing medium adapted to be wound upon one spool as it is unwound from the other, a pair of members having a peripheral opening each connected to one of said spools for rotation therewith, a plate slidable in said casing, said plate carrying a pair of fingers each engageable in the peripheral opening of one of said members when said plate is moved towards said apertured end wall and disengageable therefrom when said plate is moved away from said apertured end wall, a spring active on said plate to move it toward said apertured end wall, a roller over which said medium is adapted to pass rotatably mounted on said plate opposite the aperture in said end wall, the size of the aperture being smaller than the size of said medium and of said roller and the degree of motion of said plate in said first direction being such that when the finger on said plate has engaged with the opening in said member, said roller will clamp said medium against said casing at said aperture.

3. In combination with the magazine of claim 2, an apparatus upon which said magazine is removably replaceable comprising means for receiving said magazine and a driving wheel enterable into said aperture in said end wall when said magazine is in its proper position on said apparatus and active to press said medium between itself and said roller and to move said plate in its second direction an amount sufficient to release said medium from clamped engagement between said roller and said casing and to disengage said finger from the opening in said member, thereby freeing said spool and said medium for appropriate motion.

4. A magazine comprising a casing, a spool rotatably mounted therein, a member rotatable with said spool, a plate mounted in said casing so as to be movable between a first position in which it engages said member to inhibit rotation of said spool and a second position in which it is disengaged from said member to permit rotation of said spool, a reproducing medium adapted to be wound and unwound from said spool, said medium passing over a portion of said plate, a spring active on said plate to urge it to said first position, said portion of said plate being urged against said casing when said plate is in its first position so as to clamp said medium between itself and said casing and thus prevent said medium from moving.

5. In the magazine of claim 4, an aperture in said casing through which an element outside said casing may pass, said portion of said plate being urged against said aperture when said plate is in its first position, whereby said element outside said casing, when it is passed through said aperture, can engage said plate and move it to its second position.

6. In the magazine of claim 4, an aperture in said casing through which an element outside said casing may pass, said portion of said plate comprising a roller rotatably mounted on said plate over which said medium passes, said roller being larger than said aperture and urged against the said aperture when said plate is in its first position, whereby said element outside said casing, when it is passed through said aperture, can engage said roller and move said plate to its second position.

7. In combination with the magazine of claim 6, an apparatus upon which said magazine is removably replaceable comprising means for receiving said magazine and a driving wheel enterable into said aperture when said magazine is in its proper position on said apparatus and active to press said medium between itself and said roller and to move said plate in its second direction an amount sufficient to release said medium from clamped engagement between said roller and said casing and to disengage said plate from said member, thereby freeing said spool and said medium for appropriate motion.

8. In the magazine of claim 4, an aperture in said casing through which an element outside said casing may pass, a flange on said aperture, said portion of said plate comprising a roller over which said medium passes rotatably mounted on said plate opposite said aperture, said roller and said medium being of such a size as to overlie said flange, said roller, when said plate is in its first position, being urged against said aperture so as to clamp said medium against said flange.

9. In combination with the magazine of claim 8, an apparatus upon which said magazine is removably replaceable comprising means for receiving said magazine and a driving wheel enterable into said aperture when said magazine is in its proper position on said apparatus and active to press said medium between itself and said roller and to move said plate in its second direction an amount sufficient to release said medium from clamped engagement between said roller and said casing and to disengage said plate from said member, thereby freeing said spool and said medium for appropriate motion.

FREEMAN H. OWENS.

REFERENCES CITED

The following references are of record in the file of this patent:

UNITED STATES PATENTS

| Number | Name | Date |
|---|---|---|
| 1,372,675 | Davis | Mar. 29, 1921 |
| 1,665,784 | Hornauer | Apr. 10, 1928 |
| 2,206,032 | Foster | July 2, 1940 |